(12) United States Patent
Kwak et al.

(10) Patent No.: US 12,505,771 B2
(45) Date of Patent: Dec. 23, 2025

(54) ELECTRONIC DEVICE COMPRISING VARIABLE DISPLAY AND METHOD FOR OPERATING SAME

(71) Applicant: SAMSUNG ELECTRONICS CO., LTD., Suwon-si (KR)

(72) Inventors: Myunghoon Kwak, Suwon-si (KR); Jookwan Lee, Suwon-si (KR); Yangwook Kim, Suwon-si (KR); Jihea Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/588,738

(22) Filed: Feb. 27, 2024

(65) Prior Publication Data

US 2024/0212546 A1 Jun. 27, 2024

Related U.S. Application Data

(63) Continuation of application No. PCT/KR2022/013848, filed on Sep. 16, 2022.

(30) Foreign Application Priority Data

Sep. 30, 2021 (KR) .................. 10-2021-0129473

(51) Int. Cl.
*G09G 3/00* (2006.01)
*G06F 3/0354* (2013.01)
*G06F 3/041* (2006.01)

(52) U.S. Cl.
CPC ......... *G09G 3/035* (2020.08); *G06F 3/03543* (2013.01); *G06F 3/0416* (2013.01); *G09G 2340/0464* (2013.01); *G09G 2354/00* (2013.01)

(58) Field of Classification Search
CPC ............... G06F 3/0481; G06F 3/04812; G06F 3/04842; G06F 3/0482; G06F 3/0488;
(Continued)

(56) References Cited

U.S. PATENT DOCUMENTS 7,199,787 B2   4/2007 Lee
8,619,026 B2   12/2013 Jeong
(Continued)

FOREIGN PATENT DOCUMENTS

EP   2159677       3/2010
JP   2001147775 A  5/2001
(Continued)

OTHER PUBLICATIONS

International Search Report for PCT/KR2022/013848, mailed Jan. 18, 2023, 5 pages.
(Continued)

*Primary Examiner* — Dong Hui Liang
(74) *Attorney, Agent, or Firm* — Nixon & Vanderhye, P.C.

(57) ABSTRACT

An electronic device includes: a variable display having a main display region visible out of the electronic device, wherein a size of the main display region may be reduced from a first display region to a second display region, and including a touch screen panel serving as a first input device, and at least one processor, comprising processing circuitry, electrically connected to the variable display. At least one processor, individually and/or collectively, is configured to control the display to: display a cursor in the main display region and move the cursor into the second display region and display the cursor, based on identifying the main display region being reduced in size from the first display region to the second display region, based on the cursor being positioned in the first display region other than the second
(Continued)

display region, in the state that the size of the main display region corresponds to the first display region.

12 Claims, 11 Drawing Sheets

(58) Field of Classification Search
CPC .. G06F 3/04883; G06F 3/04845; G06F 3/038; G09G 2354/00; G09G 5/14; G09G 5/08; G09G 5/003; G09G 5/00; G09G 5/34; G09G 2320/0626; G09G 2320/0686; G09G 2320/08; G09G 2340/04; G09G 2340/045; G09G 2340/0471; G09G 2340/0478; G09G 2340/0464; G09G 2340/0442; G09G 2340/12; G09G 2340/14; G09G 2340/145; G09G 2300/046; G09G 2330/021; G09G 2360/04
See application file for complete search history.

(56) References Cited

U.S. PATENT DOCUMENTS

| | | | |
|---|---|---|---|
| 9,223,414 B2 | 12/2015 | Jeong | |
| 9,600,088 B2 | 3/2017 | Lee | |
| 10,613,587 B2 | 4/2020 | Hong et al. | |
| 11,003,218 B2 | 5/2021 | Hong | |
| 2010/0053081 A1* | 3/2010 | Jee | G06F 1/1686 345/157 |
| 2013/0023469 A1 | 1/2013 | Pikarsky et al. | |
| 2013/0314396 A1 | 11/2013 | Kang | |
| 2015/0205524 A1* | 7/2015 | Fuke | G06F 3/03543 345/163 |
| 2015/0268740 A1* | 9/2015 | Herbert | G06F 3/04812 345/157 |
| 2016/0026217 A1 | 1/2016 | Wu | |
| 2016/0077605 A1 | 3/2016 | Chen | |
| 2019/0377472 A1 | 12/2019 | Naylor | |
| 2023/0040472 A1 | 2/2023 | Kim et al. | |

FOREIGN PATENT DOCUMENTS

| | | |
|---|---|---|
| KR | 20030012815 A | 2/2003 |
| KR | 20100025360 A | 3/2010 |
| KR | 20130130453 A | 12/2013 |
| KR | 20130139485 A | 12/2013 |
| KR | 20140089874 A | 7/2014 |
| KR | 20140098552 A | 8/2014 |
| KR | 101453906 B1 | 10/2014 |
| KR | 20140129801 A | 11/2014 |
| KR | 20160147578 A | 12/2016 |
| KR | 101749644 B1 | 6/2017 |
| KR | 20190022157 A | 3/2019 |
| WO | 2021/132757 | 7/2021 |

OTHER PUBLICATIONS

Written Opinion of the ISA for PCT/KR2022/013848, mailed Jan. 18, 2023, 3 pages.
Extended European Search Report dated Oct. 31, 2024 issued in European Patent Application No. 22876723.2.

* cited by examiner

ELECTRONIC DEVICE COMPRISING VARIABLE DISPLAY AND METHOD FOR OPERATING SAME

CROSS-REFERENCE TO RELATED APPLICATIONS

This application is a continuation of International Application No. PCT/KR2022/013848 designating the United States, filed on Sep. 16, 2022, in the Korean Intellectual Property Receiving Office and claiming priority to Korean Patent Application No. 10-2021-0129473, filed on Sep. 30, 2021, in the Korean Intellectual Property Office, the disclosures of each of which are incorporated by reference herein in their entireties.

BACKGROUND

Field

The disclosure relates to an electronic device including a variable display, for example, in a slide type, or a rollable type, and a method for operating the same.

Description of Related Art

Recently, various types of electronic devices have been developed to ensure a more expanded display region without exerting an influence on portability. For example, the electronic device including the variable display may correspond to any one of a slide-type of an electronic device changed in size of a display region provided on a front surface, as at least one side of a housing slides, and a rollable-type of an electronic device having a display region, which is visible out of the electronic device, expanded, as a display wound inside or outside the housing is spread.

Although a user makes a user input through a display positioned on a front surface of the electronic device, the user may make a user input into the electronic device through a display positioned on a rear surface of the electronic device or through an external input device.

In an electronic device including a display changed in the size of a display region, when a control region is not reset as the size of the display region is changed, and when a user input into the electronic device is made through an additional input device (e.g., a display positioned on a rear surface of the electronic device), the display region changed in size and the control region may be mismatched from each other. In addition, when the moving speed of a cursor is not changed, as the size of the display region is changed, the user input may not be smooth or the user may feel bothered when moving the cursor.

SUMMARY

Embodiments of the disclosure provide an electronic device including a variable display, capable of sensing the change in a display region, resetting a control region to correspond to the changed display region, and controlling the moving speed of a cursor, and a method for operating the same.

According to an example embodiment of the disclosure, an electronic device may include: a variable display having a main display region visible out of the electronic device, wherein a size of the main display region is configured to be reduced from a first display region to a second display region, and including a first input device comprising a touch screen panel, a memory, and at least one processor, comprising processing circuitry, electrically connected to the variable display and the memory. At least one processor, individually and/or collectively, may be configured to control the display to: display a cursor in the main display region, based on the connection of the second input device to the electronic device being identified or an input made through the first input device or a second input device being identified, and move the cursor into the second display region and display the cursor, based on at least one processor, individually and/or collectively, identifying the main display region reduced in size from the first display region to the second display region, based on the cursor being positioned in the first display region other than the second display region, wherein the size of the main display region corresponds to the first display region.

According to an example embodiment of the disclosure, the electronic device may include: a variable display having a main display region changeable in size and including a first input device, wherein the first input device comprises a touch screen panel corresponding to the main display region, a memory, and at least one processor, comprising processing circuitry, electrically connected to the variable display and the memory. At least one processor, individually and/or collectively may be configured to: allow a control region of a second input device, configured to control a cursor displayed in the main display region, to currently correspond to a first size of the main display region, identify the change in size of the main display region and the second size, and control a speed of the cursor based on the changed second size of the main display region.

According to various example embodiments of the disclosure, the electronic device including the display which is variable in size of a front display region, and the method for operating the same may be provided. In the electronic device, when the front display region is controlled through a separate input unit, instead of the front display region, the change in size of the front display region may be sensed, and the control region may be reset to correspond to the changed display region. The moving speed of the cursor may be reset.

Besides, a variety of effects directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar components may be marked by the same or similar reference signs.

DETAILED DESCRIPTION

Hereinafter, various example embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
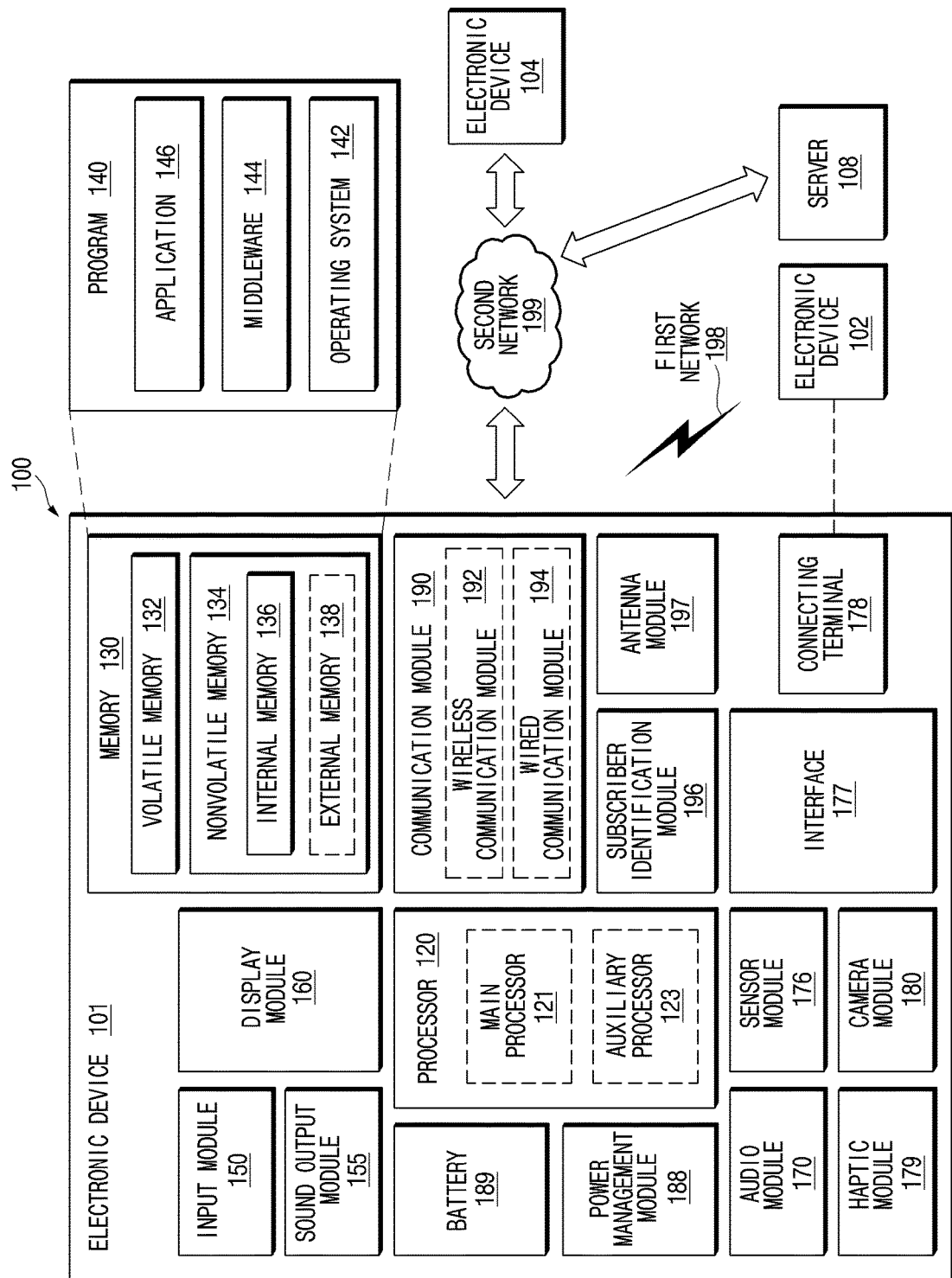
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
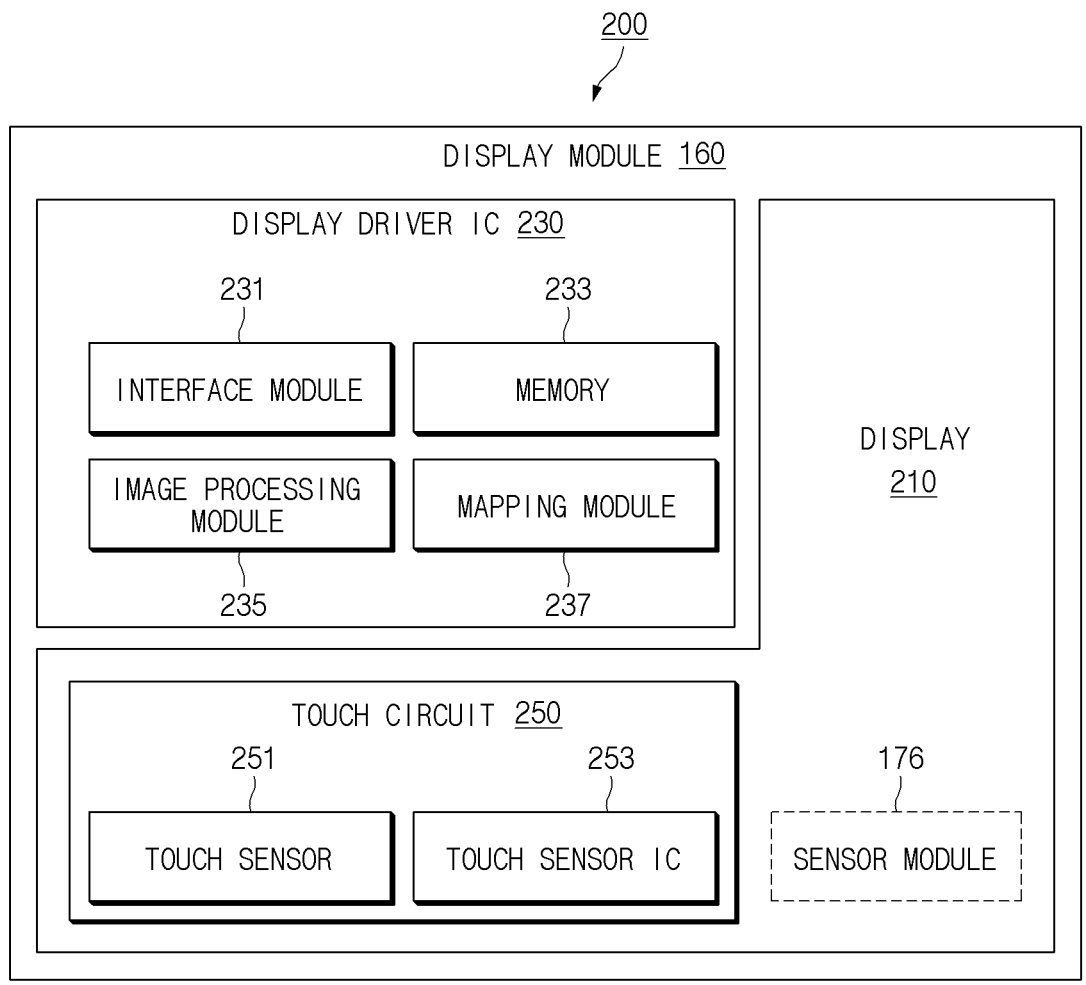
FIG. 2 is a block diagram illustrating an example configuration of a display module, according to various embodiments.

FIG. 2 is a block diagram 200 illustrating an example configuration of the display device 160 according to various embodiments. Referring to FIG. 2, the display device 160 may include a display 210 and a display driver integrated circuit (DDI) 230 to control the display 210. The DDI 230 may include an interface module (e.g., including various circuitry and/or executable program instructions) 231, a memory 233 (e.g., buffer memory), an image processing module (e.g., including various circuitry and/or executable program instructions) 235, and/or a mapping module (e.g., including various circuitry and/or executable program instructions) 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Hereinafter, an electronic device will be described in greater detail with reference to FIGS. 3 and 4, according to an example embodiment.

Figure 3:
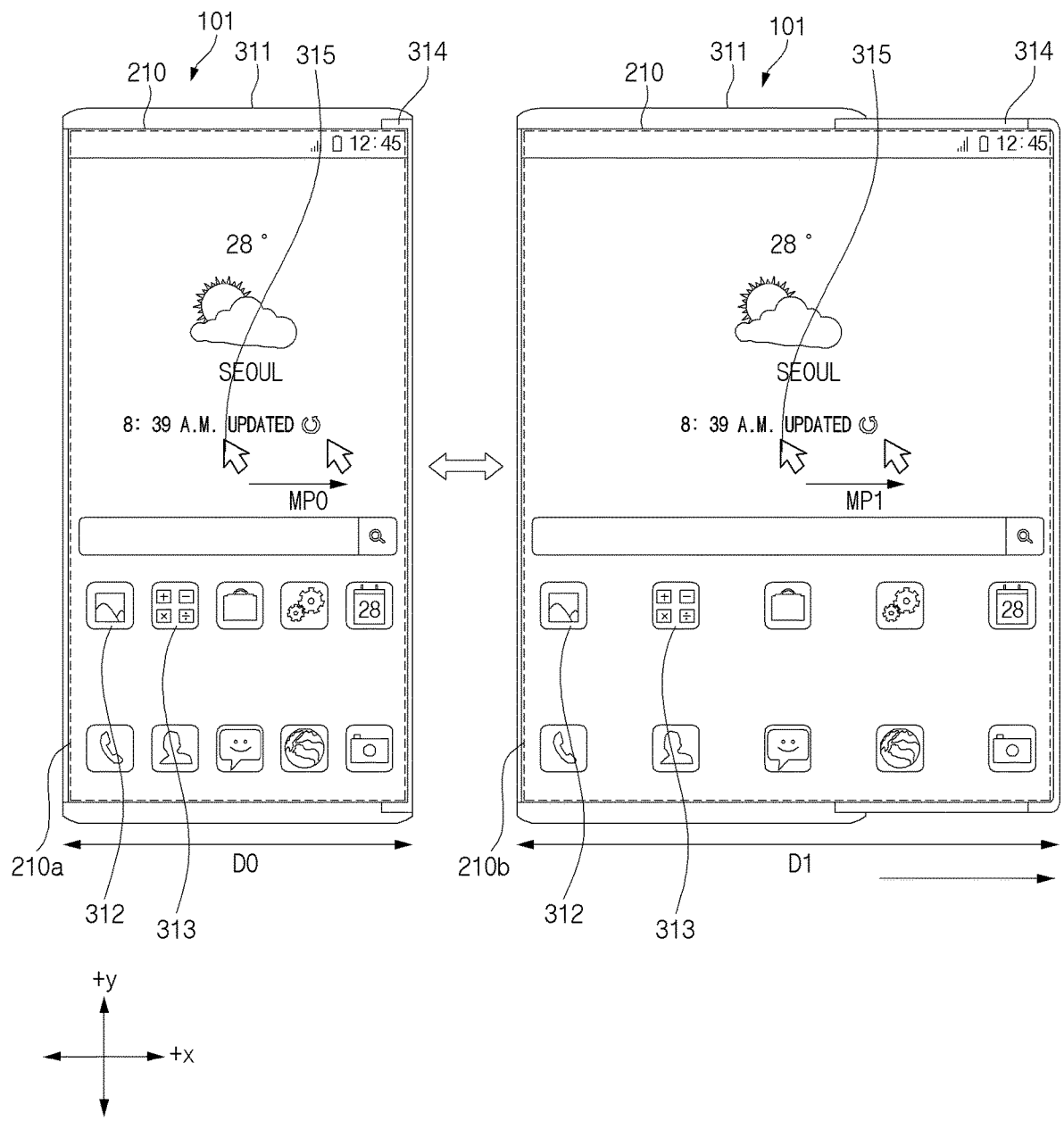
FIG. 3 is a diagram illustrating an electronic device, according to various embodiments.

FIG. 3 is a diagram illustrating an example electronic device, according to various embodiments. FIG. 4 is a diagram illustrating an example input device of an electronic device, according to various embodiments.

Referring to FIG. 3, the electronic device 101 (e.g., the electronic device 101 of FIG. 1) may include a housing 311 comprising a body of the electronic device 101 and the display 210 (e.g., the display 210 of FIG. 2) coupled to the housing 311. Hereinafter, according to various embodiments, the display 210 may be a variable display. The variable display may refer to a display having main display regions 210a and 210b of the display 210 which are changeable in size. For example, the variable display may include a flexible display. According to an embodiment, the display 210 includes a first region (e.g., expandable area) which is visible to the outside through a first surface (e.g., the front surface) of the electronic device 101 or inserted into the electronic device 101, and a second region (e.g., basic area) which is extended from one side of the first region.

For example, when the entire first region (e.g., a second flexible region) is inserted into the electronic device 101 (or the first region is not visible to the outside through the front of the electronic device 101), the second region which is visible to the outside through the first surface of the electronic device 101 may be provided as a first display region (corresponded to a first display region 210a described later) of the display 210. Additionally, in a state in which only part of the first region is inserted into the electronic device 101 (or the part of the first region is visible to the outside of the electronic device 101), the second region (e.g., a first flexible region) which is visible to the outside through the first surface of the electronic device 101 and at least a portion of the first region adjacent to the second region may be provided as a second display region of the display 210 (corresponded to a second display region 210b described later) of the display 210. Additionally or alternatively, at least a portion of the first region of the display 210 may be visible to the outside through the second side (e.g., the rear surface) of the electronic device 101 while being inserted into the electronic device 101.

The variable display 210 may correspond to any one of a sliding-type display in which a display region is expanded or contracted, as at least a portion 314 of the housing 311 of the electronic device slides in one direction (e.g., the X-axis direction), or a rollable-type display in which the main display regions of the electronic device 101 are expanded as the display 210 is unwound from the inside or the outside of the housing 311. According to various embodiments of the disclosure, the main display region may refer to a region, which is positioned on the front surface of the electronic device 101, of the display 210 of the electronic device 101.

According to various embodiments of the disclosure, the front surface of the electronic device 101 may refer to a surface mainly manipulated by a user for the use of the electronic device 101, and may be referred to as a surface to visually and most widely make visible the variable display 210 included in the electronic device 101. For example, when the variable display 210 is visible through a plurality of surfaces of the electronic device 101, a surface, which most widely visually exposes the variable display 210, of the plurality of surfaces is referred to as the front surface of the electronic device 101. In addition, the rear surface may be referred to as a surface opposite to the front surface of the electronic device 101.

As at least the portion 314 of the housing 311 of the electronic device 101 is expanded in a +x-axis direction (e.g., as at least the portion of the first region is visible to the outside of the electronic device 101), the display region of the display 210 may be expanded from the first display region 210a to the second display region 210b. As the main display region of the display 210 is expanded from the first display region 210a to the second display region 210b, the number of pixels of the main display region may be increased, but a pixel per inch (PPI) may be maintained. Accordingly, the size of a first icon 312 and the size of a second icon 313 displayed on the display region may be maintained, and the distance between the first icon 312 and the second icon 313 may be increased. Alternatively, the sizes of the first icon 312 and the second icon 313 and the distance between the first icon 312 and the second icon 313 may be maintained, and the number of icons displayed on the display region may be increased.

However, this is provided for the illustrative purpose. When the first display region 210a is expanded to the second display region 210b, the PPI may be reduced according to an embodiment. In this case, the size of icons may be increased and the distance between the icons may be maintained. Alternatively, both the sizes of the icons and the distance between the icons may be increased.

When at least the portion 314 of the housing 311 of the electronic device 101 is contracted in a −x-axis direction, the main display region of the display 210 may be contracted from the second display region 210b to the first display region 210a. Even when the main display region of the display 210 is contracted, the PPI may be maintained or the PPI may be increased. The following description will be made on the assumption that the PPI is maintained, even if the size of the main display region is increased, according to various embodiments of the disclosure.

According to an embodiment, the display 210 of the electronic device 101 may be expanded or contracted manually by a user and/or automatically by a motor. The processor (e.g., the processor 120 of FIG. 1) of the electronic device 101 may sense the change in size of the display 210. According to an embodiment, the processor of the electronic device 101 may sense the change in size of the display 210 and a change amount in the size of the display 210 through a sensing module (e.g., the sensor module 176 of FIG. 1) to sense the moving distance of the display 210 or the housing 311 and/or the driving force amount of the motor.

According to an embodiment, the display 210 of the electronic device 101 may include a touch screen panel (e.g., the touch circuit 250 of FIG. 2). The user may make a user input through the main display regions 210a and 210b of the display 210. According to an embodiment, the user may make a user input to the electronic device 101 through a separate input device instead of the main display regions 210a and 210b (or the display 210 visible through the front surface of the electronic device 101). In this case, a cursor 315 is displayed in the main display regions 210a and 210b to control the screen of the main display regions 210a and 210b.

According to an embodiment, the separate input device according to various embodiments of the disclosure may refer to all input devices except for the main display regions 210a and 210b. Hereinafter, the main display regions may be referred to as a first input device, and all input devices except for the main display regions may be referred to as a second input device.

Hereinafter, the second input device will be described in greater detail with reference to FIG. 4.

Figure 4:
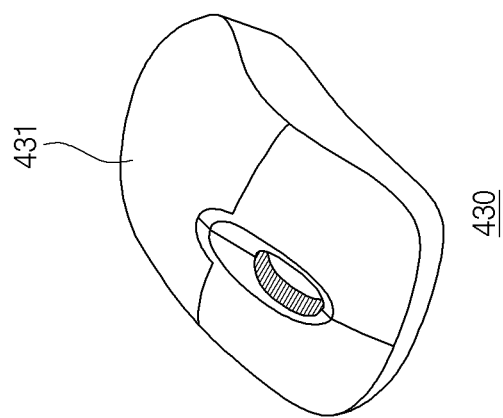
FIG. 4 is a diagram illustrating an input device of an electronic device, according to various embodiments.
Figure 4:
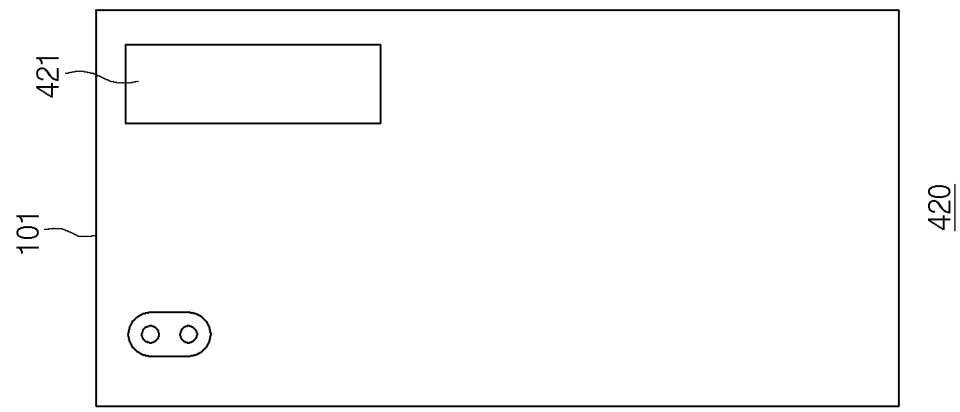
Figure 4:

Referring to FIG. 4, a first drawing 410, a second drawing 420, and a third drawing 430 of FIG. 4 illustrate examples of the second input device.

The first drawing 410 of FIG. 4 illustrates a rollable-type in which the display of the electronic device 101 is wound from the front surface of the electronic device 101 to the rear surface of the electronic device 101 or a slide-type of electronic device. The first drawing 410 of FIG. 4 may illustrate that the electronic device 101 is fully closed (the main display region (e.g., a first flexible region) of the display has the minimum size). Although not illustrated in FIG. 4, in the electronic device 101, the housing is expanded in one direction while the display is rolled or slides. Accordingly, a portion of the display (e.g., a second flexible region), which is wound to the rear surface of the electronic device 101, is gradually contracted, and the main display regions 210a and 210b are gradually expanded to be fully open (the main display region of the display has the maximum size).

A rear portion 411 of the display, which faces the rear surface of the electronic device 101, may be used as a rear display region. A user may make a user input through the rear portion 411 of the display regardless of the size of the rear portion 411 of the display. According to an embodiment, the rear portion 411 of the display may be the second input device, and the user may control the main display regions (e.g., the main display regions 210a and 210b of FIG. 3) through input to the rear portion 411.

The second drawing 420 of FIG. 4 may illustrate a rear surface of the electronic device 101 including a separate touch module 421 provided on a rear surface of the electronic device 101. The user may make a user input through the rear touch module 421. According to an embodiment, the rear touch module 421 may be the second input device, and a user may control a main display region of the display through an input to the rear touch module 421. According to an embodiment, the rear touch module 421 may be a display module (e.g., the display module 160 of FIG. 2) including a touch panel, and may be used as an auxiliary display region of the electronic device 101.

The third drawing 430 of FIG. 4 may illustrate a mouse 431 connected to the electronic device 101 through wireless communication (e.g., Bluetooth). The user may make a user input through the mouse 431. According to an embodiment, the mouse 431 may be the second input device, and the user may control a cursor displayed on the main display region of the electronic device 101 using the mouse 431.

According to various embodiments of the disclosure, an operation of controlling, by a user, a cursor displayed on a main display region (e.g., the main display region 210a and 210b of FIG. 2) through a second input device may be performed by generating, by the second input device, moving information (e.g., at least a portion of the position, the moving, the moving direction and/or the speed) of the user input (e.g., a touch or a mouse input) and moving, by the processor (e.g., the processor 120 of FIG. 1) of the electronic device 101, the cursor displayed on the main display region based on the moving information. For example, the second input device (e.g., the mouse 431) illustrated on the third drawing 430 generates the moving information of the user input and transmits the moving information to the electronic device 101 through the wireless communication. The processor (e.g., the processor 120 of FIG. 1) of the electronic device 101 may update and display the position and/or the movement of the cursor displayed on the main display region, based on the moving information received through the communication module (e.g., the communication module 190 of FIG. 1).

Although not illustrated in FIG. 4, the second input device may include a wired/wireless human interface device (HID) in addition to components of the embodiment illustrated in FIG. 4. For example, various types of second input devices may be provided, as long as the second input devices control the cursor displayed on the main display region.

When controlling the main display region of the electronic device 101 using the second input device illustrated in FIG. 4, the cursor for indicating an input position may be displayed on the main display region. The processor of the electronic device 101 may display the position of the cursor in the main display region while following the movement of the second input device, by mapping the main display region to the control region controlled through the cursor.

According to an embodiment, an electronic device having a display, which is not changed in size, may be continuously controlled by the second input device through only one mapping operation between the electronic device and the second input device, when the electronic device is connected to the second input device at an initial stage.

According to an embodiment, in the electronic device including a variable display which is changed in size, the size of the variable display may be changed. In this case, the control region of the second input device and the main display region of the electronic device may need to be mapped to each other. As the display region of the display is enlarged, the number of the pixels in hardware may be increased. Accordingly, the moving speed of the cursor may need to be changed.

Hereinafter, a method for changing the moving speed of a cursor while following the change in the size of the main display region of the display will be described in greater detail with reference to FIG. 3.

Referring to FIG. 3, the electronic device 101 may display the cursor 315 in the main display regions 210a and 210b, when receiving a control input through the second input device.

According to an embodiment, as the main display region of the electronic device 101 is enlarged from the first display region 210a to the second display region 210b, the number of pixels in hardware is increased in the main display region. Accordingly, in the state that a PPI is maintained, the resolution may be increased.

In this case, when the same value is input through the second input device to move the same movement as that the movement before the main display region is expanded, the user may feel strange for the moving speed of the cursor 315. For example, although the user inputs the same input value, the user may feel like that the moving speed of the cursor 315 more slows down in the expanded main display region, as compared to the case before the main display region is expanded. Accordingly, as the size of the main display region is changed, the moving speed of the cursor 315 may need to be changed.

According to an embodiment, the processor of the electronic device 101 may obtain the speed of the cursor 315, which is to be changed as the size of the main display region is changed, through Equation 1.

$$D0/S0 = D1/S1 * a \qquad \text{Equation 1}$$

In this case, 'D0' may be the size of the first display region 210a, and 'D1' may be the size of the second display region 210b. According to various embodiments of the disclosure, the size of the display region may refer to the length of the display region in one direction, when the display region is expanded in one direction. In addition, 'S0' may denote a speed of the cursor 315 in the first display region 210a, and 'S1' may denote a speed of the cursor 315, after the main display region is expanded to the second display region 210b. In addition, 'a' may denote a factor for changing a speed, and the extent of the speed to be changed may be determined by changing 'a'.

In addition, according to an embodiment, the processor of the electronic device 101 may obtain the speed of the cursor 315 through Equation 2.

$$S = MP/MI \qquad \text{Equation 2}$$

In this case, 'MI' may denote the change amount of coordinates input through the second input device. For example, when the second input device is a wireless mouse connected to the electronic device 101, 'MI' may denote a movement amount of the mouse by the user, for example, the change amount of coordinates input by the user through the mouse. In addition, for example, when the second input device is a rear portion of the display or a rear touch module positioned on the rear surface of the electronic device 101, 'MI' may denote the change amount of coordinates which are touch-input by the user to the rear portion of the display or the rear touch module. In addition, 'MP' may indicate the number of pixels which are moved by the cursor 315 in the main display region, in response to the input through the second input device.

For example, the value of 'S0' may be obtained by dividing the number 'MP0' of pixels, through which the cursor 315 moves, in the first display region 210a by the change amount MI of coordinates input through the second input device.

When the processor of the electronic device 101 obtains the value of 'S1' through Equation 1 and Equation 2, the main display region of the electronic device 101 may be the second display region 210b, and the cursor 315 may be controlled to move at the obtained speed of 'S1'. When the main display region of the electronic device 101 is the second display region 210b, the processor of the electronic device 101 may identify the change amount MI of coordinates of a user input, as the user input is made through the second input device, may calculate the number MP1 of pixels for movement of the cursor in the second display region 210b, and may move the cursor 315 by the calculated number MP1 of pixels.

According to an embodiment, when 'a' is set to be greater than the value of D0/D1 in Equation 1, the processor of the electronic device 101 may control the cursor 315 to move at a lower speed, after the main display region is expanded. When 'a' is set to be less than the value of D0/D1 in Equation 1, the processor of the electronic device 101 may control the cursor 315 to move at a higher speed, after the main display region is expanded. When 'a' is set to be equal to the value of D0/D1 in Equation 1, the processor of the electronic device 101 may control the cursor 315 to move at an equal speed without the change of the moving speed, after the main display region is expanded.

For example, when 'a<=D0/D1', the value of 'MP1' may be greater than or equal to the value of 'MP0'. To the contrast, when 'D0/D1<=a', the value of 'MP1' may be less than or equal to the value of 'MP0'.

According to an embodiment, when 'a<=D0/D1', as the size of the main display region of the electronic device 101 is expanded, the moving speed of the cursor 315 in the main display region per change amount of coordinates of the user input, which is made through the second input device, may be increased in proportion to the length by which the main display region is expanded. According to an embodiment, when the second input device is the rear portion (e.g., the rear portion 411 of the display of FIG. 4) of the display, which is positioned on the rear surface of the electronic device, or is the additional rear touch module (e.g., the rear touch module 421 of FIG. 4), the cursor 315 may move through the larger number of pixels in the main display region which is expanded, as compared to the main display region which is not expanded, with respect to an equal extent of touch input.

According to various embodiments of the disclosure, the operation of the electronic device may be applicable to several visual interactions displayed on the main display region depending on motions of direct or indirect inputs by a user, in addition to the cursor 315.

According to various embodiments of the disclosure, the electronic device may change the moving speed of the cursor, which is displayed on the main display region, to express the input through the second input device, as the size of the main display region is changed, thereby improving the experience of the user.

Hereinafter, a user interface (UI) of the electronic device according to an embodiment will be described in greater detail with reference to FIG. 5.

Figure 5:
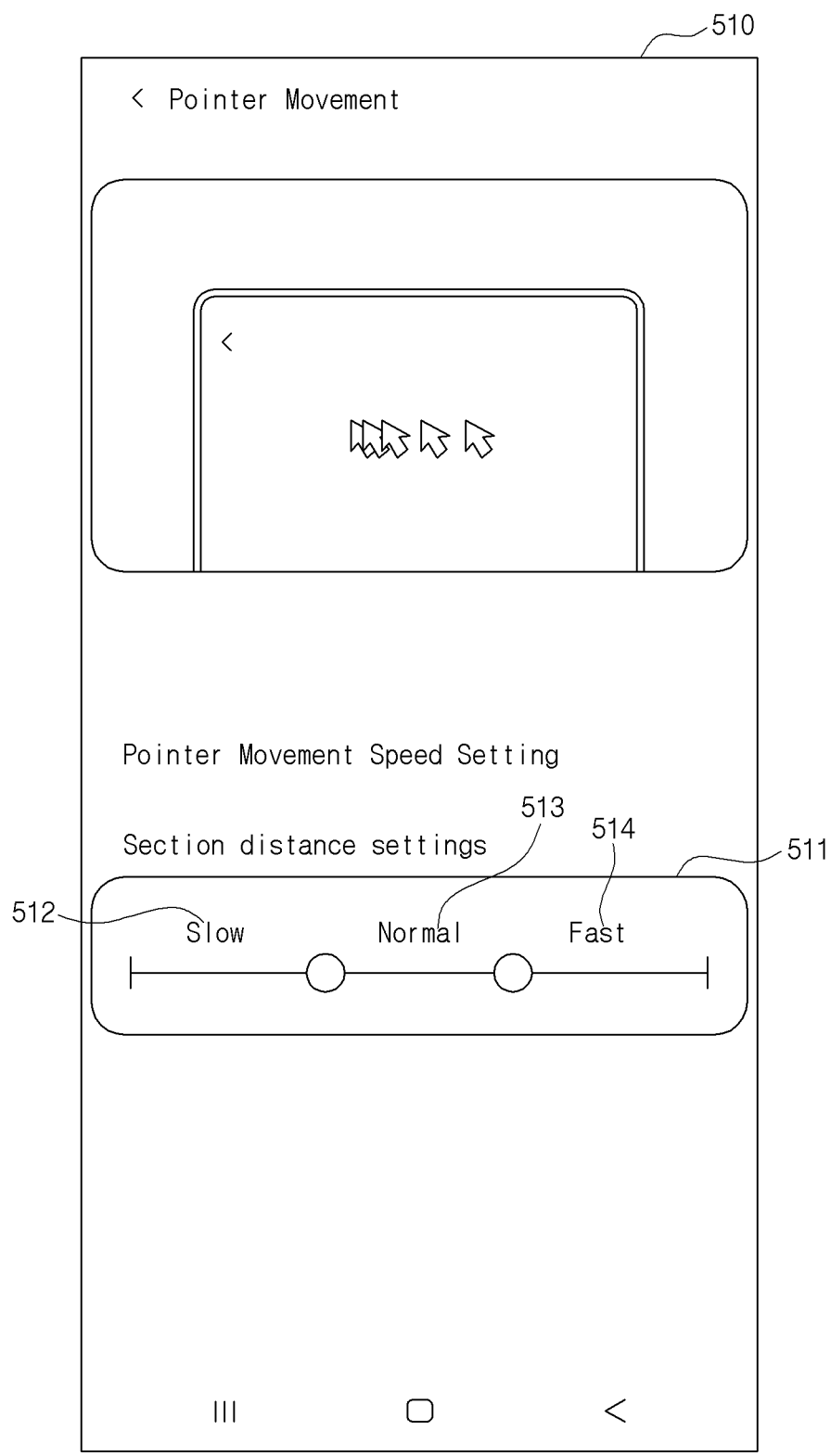
FIG. 5 is a diagram illustrating an example UI to set the moving speed of a cursor of an electronic device, according to various embodiments.

FIG. 5 is a diagram illustrating an example UI to set the moving speed of the cursor of the electronic device according to various embodiments.

Referring to FIG. 5, a display (e.g., the display 210 of FIG. 2) of an electronic device (e.g., the electronic device 101 of FIG. 1) may display a setting screen 510 for setting a speed of a cursor (e.g., the cursor 315 of FIG. 3) displayed in a main display region.

The value of 'a' of Equation 1 described with reference to FIG. 3 may be a value preset for an electronic device according to an embodiment, and may be a value set by the user through the setting screen 510.

According to an embodiment, the setting screen 510 may include a speed setting UI 511 for setting a moving speed of a cursor. The speed setting UI 511 may include a first UI 512 for setting a moving speed of the cursor to be slower, a second UI 513 for setting the moving speed of the cursor to be constant, and a third UI 514 for setting the moving speed of the cursor to be faster, based on when a size of the main display region is expanded.

According to an embodiment, the processor of the electronic device may set the value 'a' to satisfy 'a>D0/D1' when the first UI 512 is selected by the user, set the value 'a' to satisfy 'a=D0/D1' when the second UI 513 is selected, and may set the value 'a' to satisfy 'a<D0/D1' when the third UI 514 is selected.

According to an embodiment, when the first UI 512 is selected by the user, the processor of the electronic device may control the moving speed of the cursor to be slower when the main display region is expanded, and may control the moving speed of the cursor to be faster when the main display region is contracted According to an embodiment, when the second UI 513 is selected by the user, the processor of the electronic device may control the moving speed of the cursor to be constant without change, when the main display region is expanded and when the main display region is contracted.

According to an embodiment, when the third UI 514 is selected by the user, the processor of the electronic device may control the moving speed of the cursor to be faster when the main display region is expanded, and may control the moving speed of the cursor to be slower when the main display region is contracted.

Hereinafter, an example operation of the electronic device according to an embodiment will be described in greater detail with reference to FIG. 6.

Figure 6:
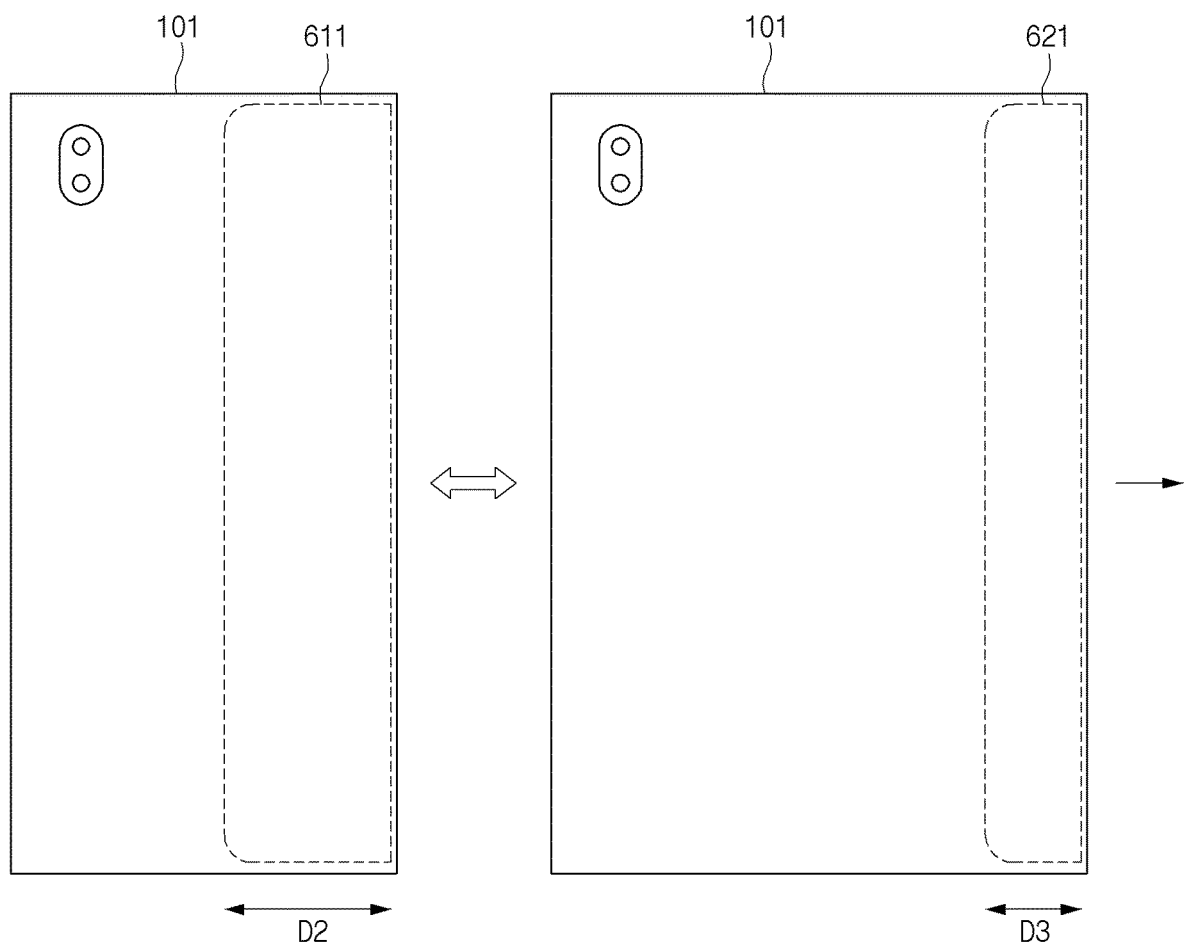
FIG. 6 is a diagram illustrating a rear surface of an electronic device, according to various embodiments.

FIG. 6 is a diagram illustrating a rear surface of an electronic device, according to various embodiments.

Referring to FIG. 6, the electronic device 101 may be a rollable-type of an electronic device, in which the display is rolled at the side of the rear surface of the electronic device 101, or a slide-type of an electronic device. A rear portion (for example, a first region 611 and a second region 621) of the display visible through the rear surface of the electronic device 101 may be employed as a rear display region, and the user may make a user input through the rear portion of the display. According to an embodiment, the rear portion of the display may be the second input device. The user may control the main display region of the display through the input into the rear portion.

According to an embodiment, as the housing of the electronic device 101 is expanded in one direction, the display is rolled or slides. Accordingly, the portion, which is rolled at the side of the rear surface of the electronic device 101, of the display may be gradually contracted, and the main display region may be gradually expanded. For example, when the size of the main display region of the electronic device 101 is minimized/reduced, the rear portion of the display may be the first region 611 having a first length 'D2'. As the main display region is enlarged, the rear portion of the display is gradually contracted to be the second region 621 having a second length 'D3'.

According to an embodiment, when the main display region is enlarged, the size of the rear portion of the display is reduced. Accordingly, an input allowing region may be contracted. Therefore, even if the same input is made to the rear portion of the display, the processor of the electronic device 101 may increase the moving speed of the cursor such that the cursor moves through the larger number of pixels in the main display region, as compared to that the input allowing region is not contracted.

For example, when the second input device is changed from the first region 611 to the second region 621, the processor of the electronic device may control the moving speed of the cursor to be faster in proportion to a change extent from the first length 'D2' to the second length 'D3'.

For example, when the input allowing region of the second input device is contracted as the main display region of the electronic device 101 is enlarged, the processor of the electronic device 101 may control the moving speed of the cursor to be faster, as compared to the second input device having the input allowing region which is not changed even if the main display region is enlarged.

The following description will be made with reference to FIG. 7, regarding a method for determining a position for displaying a cursor, when the size of a main display region of an electronic device is changed, according to an embodiment.

Figure 7:
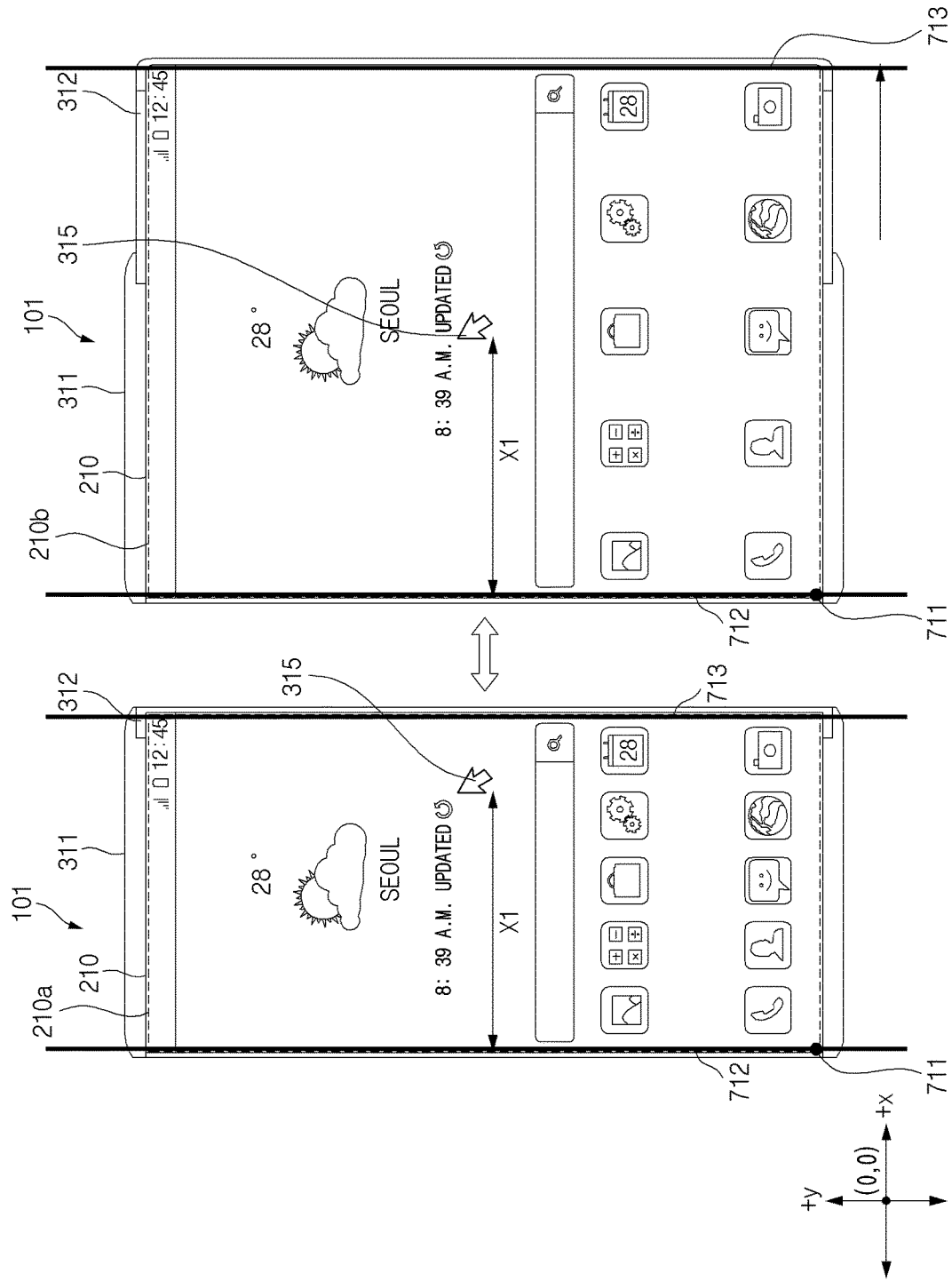
FIG. 7 is a diagram illustrating an electronic device, according to various embodiments.

FIG. 7 is a diagram illustrating an electronic device, according to various embodiments. The same components as those of the above described embodiment will be assigned with the same reference numerals, and descriptions thereof may not be repeated here.

Referring to FIG. 7, the processor of the electronic device 101 may maintain the display position of the cursor 315, even if the main display region is changed from the first display region 210*a* to the second display region 210*b* such that the size of the main display region is changed.

For example, when the main display region of the electronic device 101 is the first display region 210*a*, and when the cursor 315 is displayed at a first distance (or at a first position) 'X1' from a reference line 712, even if the main display region is enlarged to the second display region 210*b*, the processor of the electronic device 101 may maintain the position of the cursor 315 at the first distance 'X1' from the reference line 712. In other words, the processor of the electronic device 101 may display the position of the cursor 315 in the form of absolute coordinates, even if the size of the main display region is changed.

In this case, the reference line 712 may refer to a side opposite to a side 713, which is expanded, of four sides of the display 210 of the electronic device 101. An origin of the absolute coordinates may be any point of the reference line 712.

According to an embodiment, although FIG. 7 illustrates that the origin is set as a reference point 711, which is positioned at the lower left, of four vertexes of the display 210 by way of example. The coordinates of the reference point 711 may be (0,0).

According to an embodiment, when the cursor 315 is displayed in the form of absolute coordinates, the coordinates of the cursor 315 based on the reference point 711 may be maintained, even if the size of the main display region is changed.

According to an embodiment, when the size of the main display region is reduced, due to the contraction from the second display region 210*b* to the first display region 210*a*, as the cursor 315 is positioned in the contracted region, the cursor 315 may be disappeared. In this case, the processor of the electronic device 101 may control the cursor 315 to be in the main display region.

According to an embodiment, when the main display region is contracted in the state that the cursor is positioned in the contracted display region, the processor of the electronic device 101 may display the cursor 315 at any position adjacent to the opposite side (expanded side) 713 of the reference line 712.

According to an embodiment, when the main display region is contracted in the state that the cursor is positioned in the contracted display region, the processor of the electronic device 101 may display the cursor 315 at any position of the main display region.

According to an embodiment, as the processor of the electronic device 101 identifies that the main display region is contracted in the state that the cursor is positioned in the contracted display region, the processor may display the cursor 315 by changing from absolute coordinates to relative coordinates. Hereinafter, a manner for displaying the cursor in form of the relative coordinates will be described in greater detail.

The following description will be made with reference to FIGS. 8 and 9, regarding a method for determining a position for displaying a cursor, when the size of a main display region of an electronic device is changed, according to an embodiment.

Figure 8:
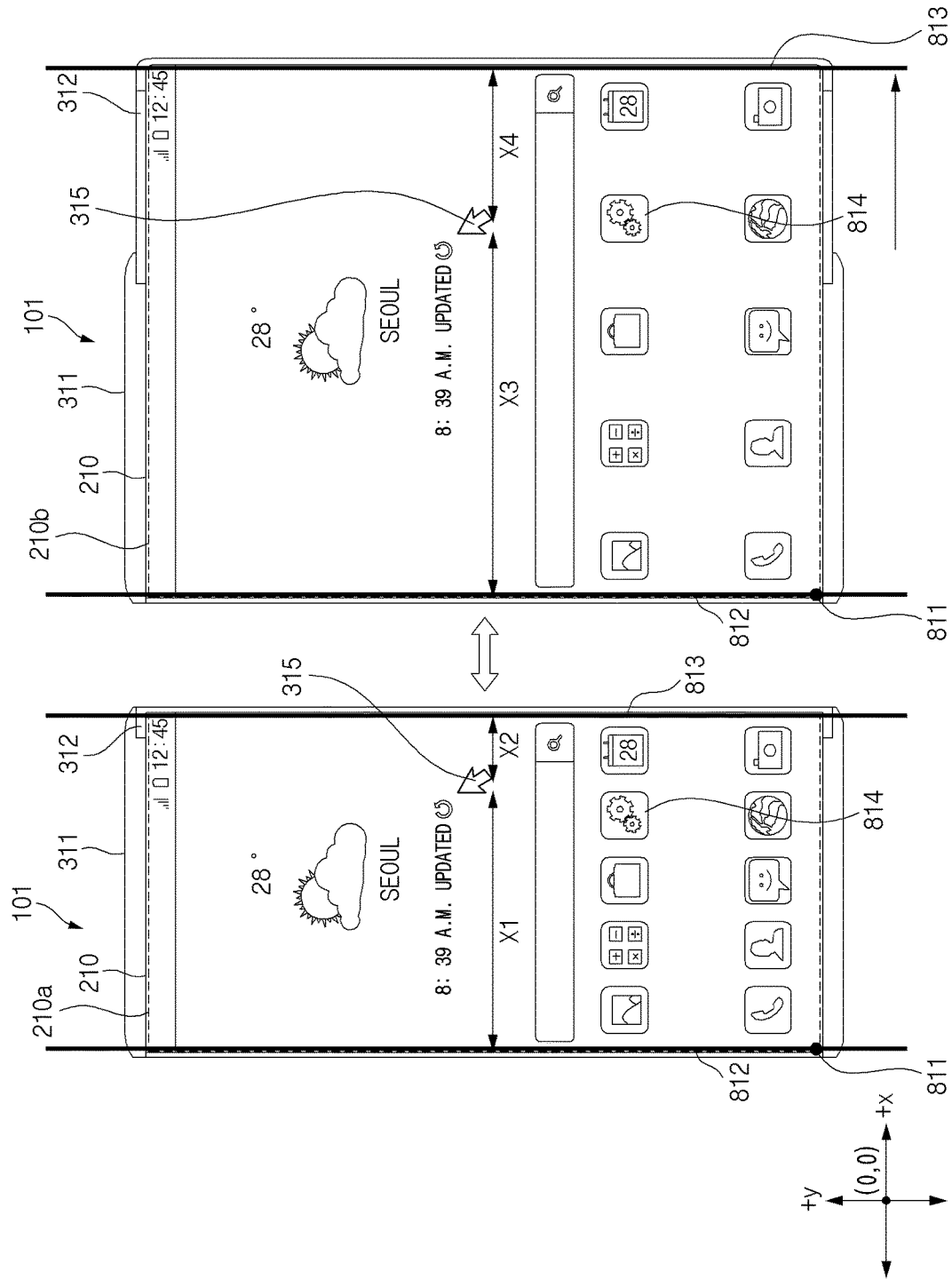
FIG. 8 is a diagram illustrating an electronic device, according to various embodiments.

FIG. 8 is a diagram illustrating an electronic device, according to various embodiments. FIG. 9 is a diagram illustrating an electronic device, according to various embodiments. The same components as those of the above described embodiment will be assigned with the same reference numerals, and the duplication thereof may not be repeated here.

Referring to FIG. 8, the display position of the cursor 315 may be reset to have relative coordinates and displayed, as the main display region of the electronic device 101 is changed from the first display region 210a to the second display region 210b. According to an embodiment, the manner of displaying the cursor 315 in the form of the relative coordinates is to display the cursor 315 by moving the position of the cursor 315 to correspond to an expanding ratio of the main display region.

According to an embodiment, when displaying the cursor 315 in the form of the relative coordinates, the processor of the electronic device 101 may determine a coordinate value of the cursor 315, based on a reference point 811 set on a reference line 812 and may control the position of the cursor 315, such that the ratio to the distance 'X1' from the reference line 812 to the cursor 315 to the distance 'X2' of the cursor 315 from a line 813 opposite to the reference line 812 is constantly maintained after the main display region is enlarged/contracted, which is the same as or similar to the manner for displaying the cursor in the form of the absolute coordinates as described with reference to FIG. 7. In other words, the processor of the electronic device 101 may display the position of the cursor 315 such that X1/X2=X3/X4 or X1/X2 ∝ X3/X4.

According to an embodiment, when the size of the main display region is changed in the +x-axis direction, based on the reference point 811, y-axis coordinates of the cursor 315 are not changed. Accordingly, the processor of the electronic device 101 actually moves only the +x-axis coordinates of the cursor 315 and may determine the +x-axis coordinates of the cursor 315 to coordinates for satisfying 'X1/X2=X3/X4' or 'X1/X2 ∝ X3/X4'

According to an embodiment, when displaying the cursor 315 in the form of the relative coordinates, even if the size of the main display region is continuously changed, the processor of the electronic device 101 may smoothly move the cursor 315. In addition, the relative position between the content (e.g., an icon 814) and the cursor 315 displayed in the main display region is identically or similarly maintained, even after the main display region is enlarged, so the convenience of the user may be improved. For example, the cursor 315 may be positioned closely to the first icon 814 before or after the main display region is expanded.

Figure 9:
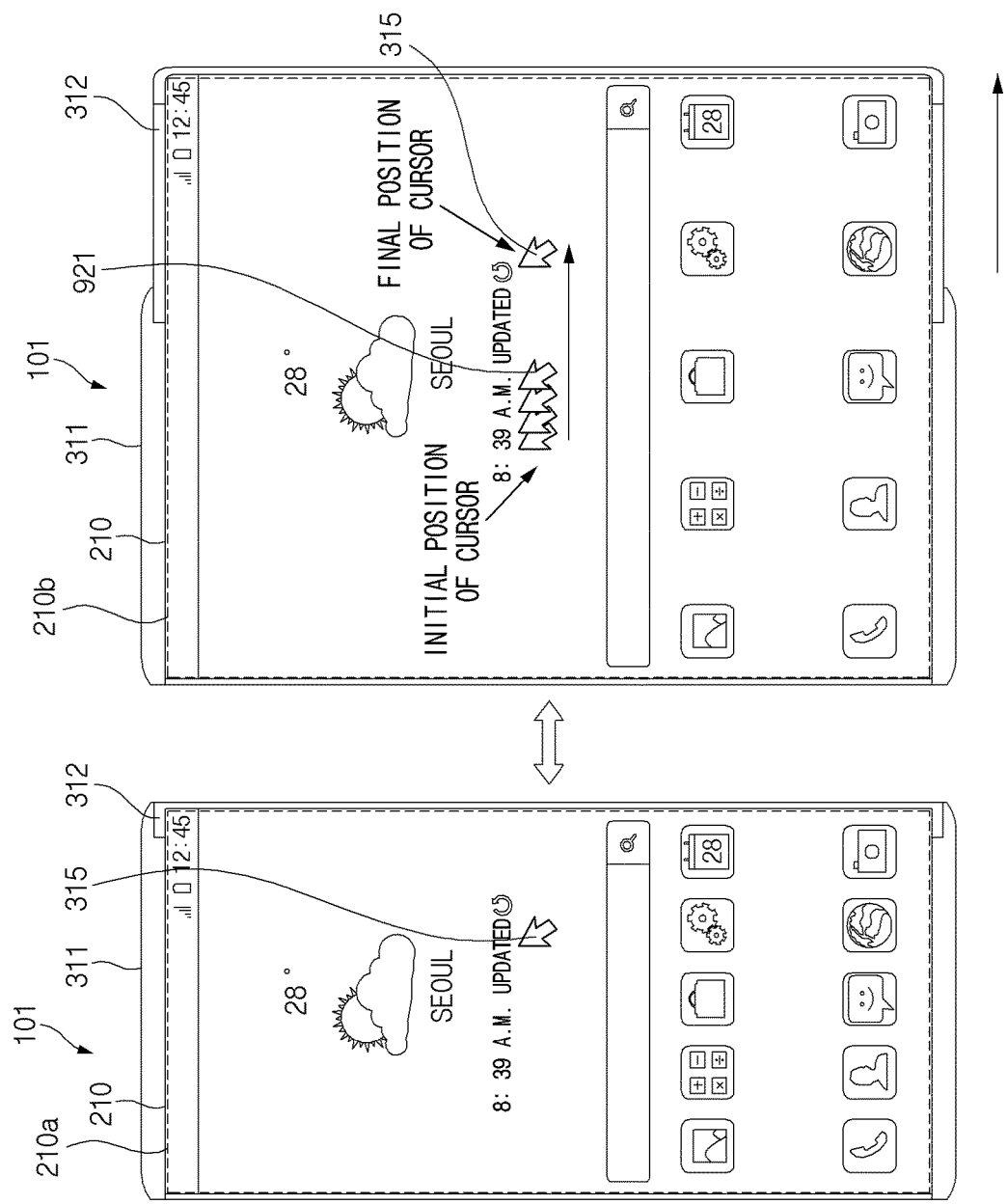
FIG. 9 is a diagram illustrating an electronic device, according to various embodiments.

Referring to FIG. 9, the processor of the electronic device 101 may move the cursor 315 through a manner for displaying a cursor in the form of a relative coordinate, when the main display region is expanded from the first display region 210a to the second display region 210b. According to an embodiment, the processor of the electronic device 101 may continuously obtain the relative coordinates of the cursor 315 and move the cursor 315, based on the changed length of the main display region, when the main display region is continuously expanded.

According to an embodiment, when the display 210 of the electronic device 101 is expanded to be in a preset size, the processor may obtain information on a length for expanding the main display region, which is stored in the memory in advance, and may calculate and apply the number of pixels for the movement of the cursor 315, based on the obtained length for expanding the main display region. Accordingly, the information on a length for expanding the main display region may include at least one of a length for expanding the main display region, the number of increased pixels, and a moving time taken to expand the main display region.

According to an embodiment, the processor of the electronic device 101 expresses a moving path of the cursor 315 in a graphic effect 921 to exhibit an effect in which a pointer smoothly moves and to provide convenience and aesthetics to the user.

Hereinafter, the operation of the electronic device according to an embodiment will be described in greater detail with reference to FIGS. 10 and 11.

Figure 10:
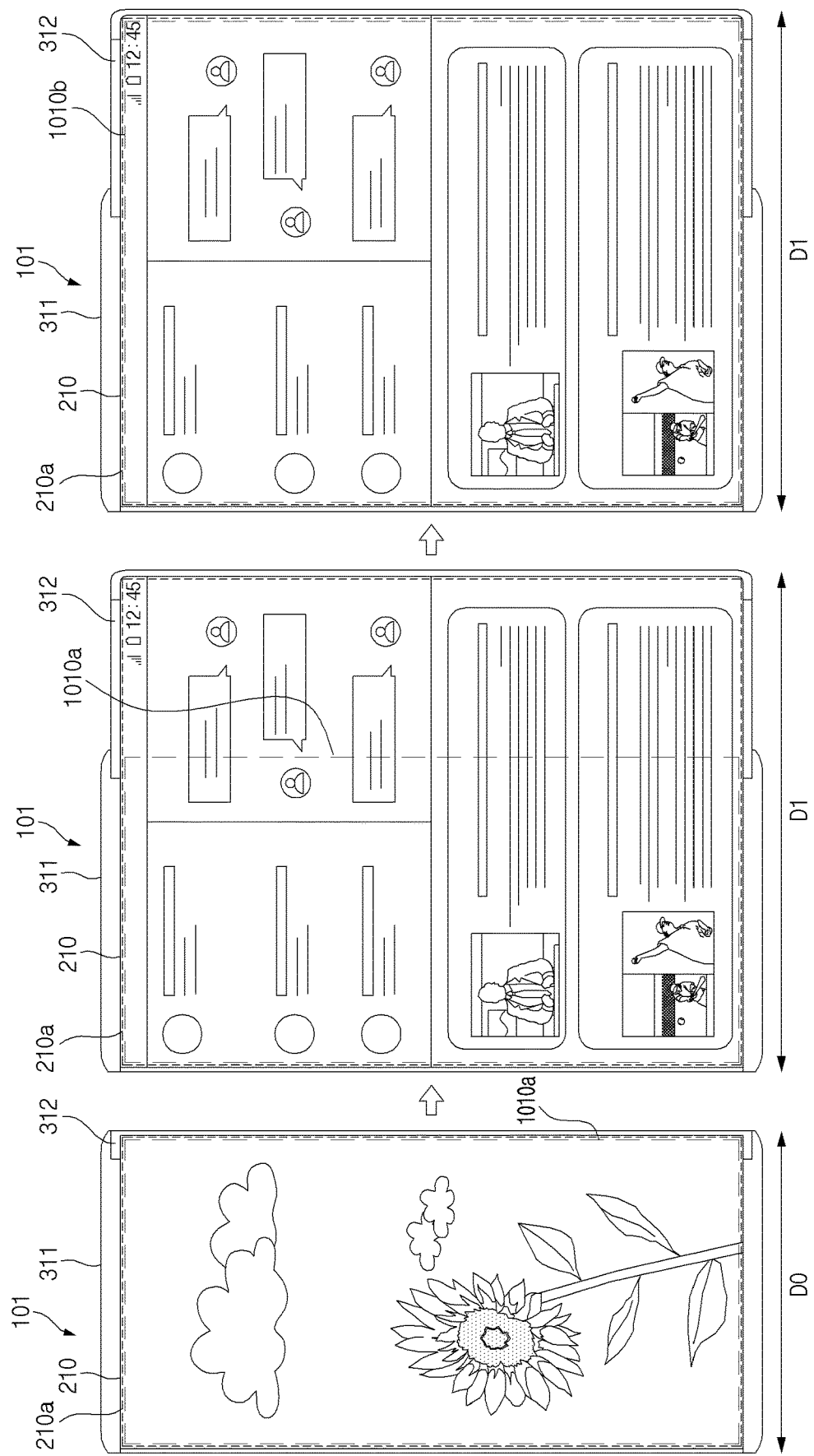
FIG. 10 is a diagram illustrating an electronic device, according to various embodiments.

FIG. 10 is a diagram illustrating an electronic device, according to various embodiments. FIG. 11 is a flowchart illustrating an example operation of an electronic device, according to various embodiments. The same components as those of the above described embodiment will be assigned with the same reference numerals, and the duplication thereof may not be repeated here.

Referring to FIG. 10, the processor of the electronic device 101 may set a control region of a second input device, based on the main display region of the display 210, when connected to the second input device at an initial stage (or when employing the second input device at the initial stage). For example, when connected to the second input device at the initial stage, and when the main display region is the first display region 210a having a first length 'D0', the processor of the electronic device 101 may set a first control region 1010a of the second input device, based on the first display region 210a.

When there is no change in the size of the main display region, the processor of the electronic device 101 may display an input of the second input device using a cursor in the first control region 1010a and may control the first display region 210a.

However, when the main display region of the electronic device 101 is changed to the second display region 210b having the second length D1 in the state that the connection to the second input device is maintained, and when the processor of the electronic device 101 does not reset the control region of the second input device, based on the change in the size of the main display region, the display region may be mismatched from the control region.

For example, when the processor of the electronic device 101 does not reset the control region of the second input device to a second control region 1010b to correspond to the expanded second display region 210b, as the second display region 210b is controlled based on the first control region 1010a, the expanded display region may not be controlled through the second input device.

Accordingly, when the size of the main display region is changed in the state that the connection of the second input device is maintained, the processor of the electronic device 101 may identify the size of the main display region thus changed and may reset the control region of the second input device. Hereinafter, a method for resetting the control region of the second input device will be described with reference to FIG. 11.

Figure 11:
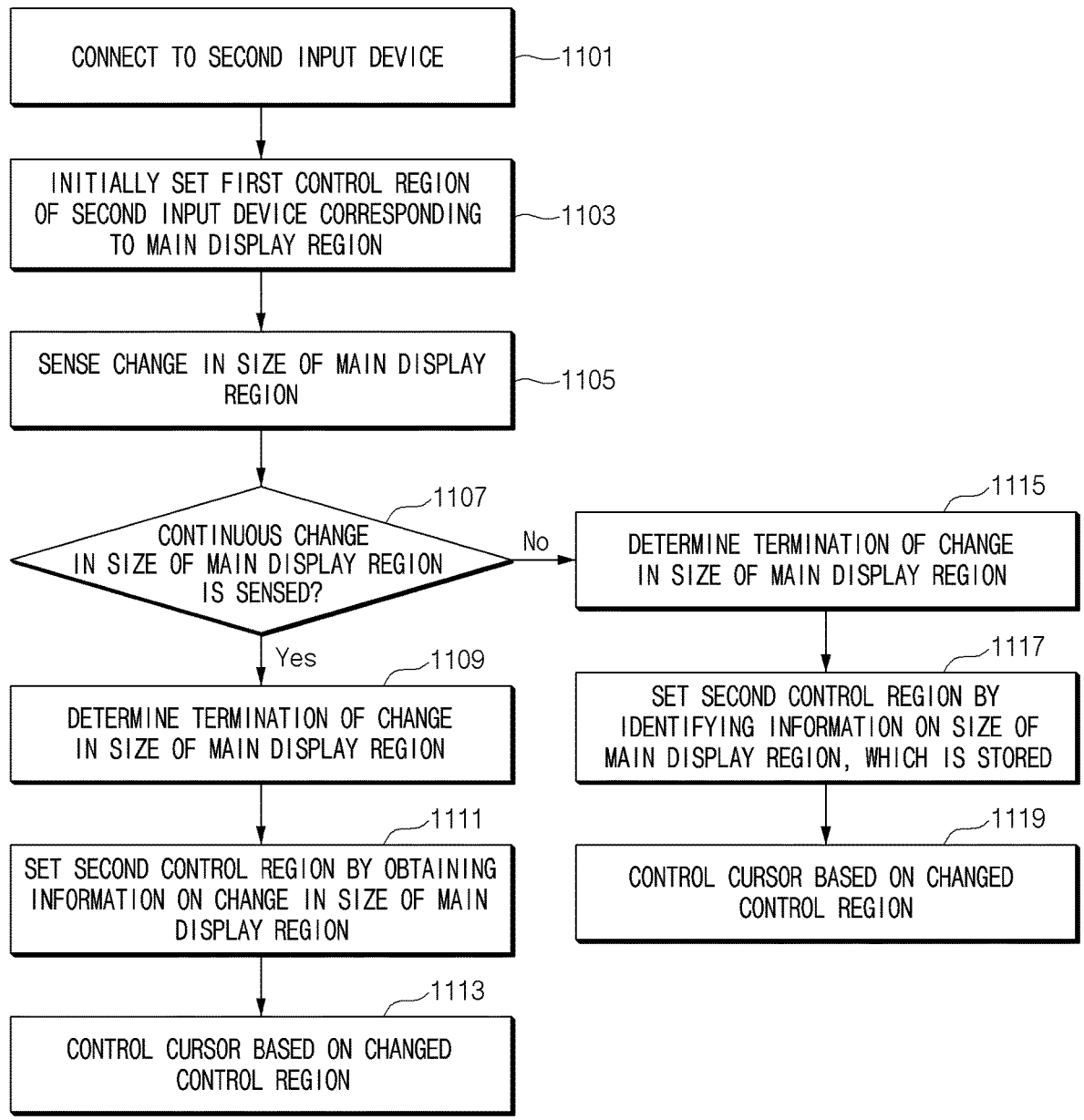
FIG. 11 is a flowchart illustrating an example operation of an electronic device, according to various embodiments.

Referring to FIG. 11, in operation 1101, the processor (e.g., the processor 120 of FIG. 1) of the electronic device (e.g., the electronic device 101 of FIG. 1) may be connected to the second input device (e.g., the second input devices 411, 421, and 431) of FIG. 4. According to an embodiment, when the second input device needs to be additionally connected, which is similar to a wireless mouse (e.g., the mouse 431 of FIG. 1), the processor of the electronic device may be connected to the second input device. When the second input device does not need to be additionally connected, which is similar to a rear display (e.g., the rear display 411 of FIG. 4) or the rear touch module (e.g., the rear touch module 421 of FIG. 4), the processor of the electronic device may identify an input through the second input device.

In operation 1103, the processor of the electronic device may set the first control region, which is controlled by an input through the second input device, to correspond to the size of the first display region (e.g., the first display region 210a of FIG. 3), which is a present main display region. According to an embodiment, the sizes of the first display region and the first control region may be the same or similar. For example, the first display region and the first control region may have mutually different sizes by a size (e.g., 1 pixel) set such that the user may not recognize the size difference.

In operation 1105, the processor of the electronic device may sense a change in the size of the main display region of the display. According to an embodiment, the display of the electronic device may be expanded or contracted manually by a user and/or automatically by a motor. When the display is expanded or contracted automatically, the display may be expanded or contracted by identifying inputs to, for example, a mechanical button, fingerprint recognition, and a UI touch input.

In operation 1107, the processor of the electronic device may sense whether the size of the main display region is continuously changed. According to an embodiment, regarding the change in the size of the main display region, the size to be changed may be preset or may not be preset.

According to an embodiment, when the size, which is to be changed, of the main display region is preset, the information on the sizes at multiple stages may be stored in the memory (e.g., the memory 130 of FIG. 1) of the electronic device, and the size of the main display region may be changed to a relevant size, in response to an input of selecting the stage by the user.

According to an embodiment, when the size, which is to be changed, of the main display region is not preset, the size of the main display region may be continuously changed, based on an extent in which the user manually expands or contracts the main display region or a time in which the user consecutively makes an input to a hardware/software key. According to an embodiment, that the size of the main display region is continuously changed, may refer to that the change in size of the main display region is sensed within a specific time, after the size of the main display region is changed.

In operation 1109, the processor of the electronic device may determine whether the change in size of the main display region is terminated after sensing the continuous change in size of the main display region. According to an embodiment, the processor of the electronic device may determine the change in size of the main display region as being terminated, when the change in the size of the main display region is not sensed within a specific time after the size of the main display region is changed.

In operation 1111, the processor of the electronic device may set a control region to a second control region, after obtaining the information on the change in the size of the main display region.

According to an embodiment, the processor of the electronic device may sense the change amount in the size of the main display region of the display through a sensing module to sense a moving distance of the display or the housing or a sensing module to sense a driving extent of a motor. However, the manner for sensing the change amount in the size of the main display region is not limited thereto. For example, various manners for sensing the change extent of the size of the main display region may be provided, as long as the processor of the electronic device is able to obtain a change amount in the size of the main display region of the display.

The processor of the electronic device may reset a control region of the second input device to correspond to the size of the obtained main display region.

In operation 1113, the processor of the electronic device may control a cursor, based on the changed control region. According to an embodiment, the processor of the electronic device may move a cursor and/or set the speed of the cursor, based on the changed control region.

In operation 1107, when the processor of the electronic device does not determine the size of the main display region as being continuously changed, the processor of the electronic device may determine the size of the main display region as being the preset size. In operation 1115, the processor of the electronic device may determine whether the change in size of the main display region is terminated.

In operation 1117, the processor of the electronic device may set the control region to the second control region, by identifying the information on the change in size of the main display region, which is stored in the memory. In this case, since the main display region of the electronic device is changed to be in the preset size, the processor of the electronic device may obtain the size of the main display region from the memory, by identifying the start and the end of the main display region.

According to an embodiment, stages of changing the size of the main display region may include a plurality of intermediate stages between the minimum size and the maximum size. The information on the size of the main display region in the plurality of intermediate stages may be stored in the memory through the setting of the electronic device in manufacturing or through user setting.

The processor of the electronic device may reset a control region of the second input device to correspond to the size of the obtained main display region.

In operation 1119, the processor of the electronic device may control a cursor, based on the changed control region. According to an embodiment, the processor of the electronic device may move a cursor and/or set the speed of the cursor, based on the changed control region.

According to an embodiment of the disclosure, even if the size of the main display region of the electronic device is changed, in the state that the electronic device is connected to the second input device, the connection with the second input device is maintained without connecting the second input device after disconnecting the second input device, while the control region of the second input device is reset to correspond to the size of the changed main display region. Accordingly, an input error problem may be addressed, and the usability of the electronic device may be improved.

According to an example embodiment of the disclosure, an electronic device may include: a variable display having a main display region visible out of the electronic device, wherein a size of the main display region is configured to be reduced from a first display region to a second display region, and including a first input device comprising a touch screen panel, a memory, and at least one processor, comprising processing circuitry, electrically connected to the variable display and the memory. At least one processor, individually and/or collectively, may be configured to control the display to: display a cursor in the main display region, based on the connection of the second input device to the electronic device being identified or an input made through the first input device or the second input device being identified, and move the cursor into the second display region and display the cursor, based on at least one processor, individually and/or collectively, identifying the main display region reduced in size from the first display region to the second display region, based on the cursor being positioned in the first display region other than the second display region, in the state that the size of the main display region corresponds to the first display region.

According to an example embodiment of the disclosure, at least one processor, individually and/or collectively, may be configured to determine coordinates of the cursor in a first direction, using a ratio between a first length of the first display region in the first direction and a second length of the second display region in the first direction, based on the main display region being contracted in the first direction.

According to an example embodiment of the disclosure, at least one processor, individually and/or collectively, may be configured to change the cursor to display the cursor using relative coordinates, based on the contraction of the main display region being identified, while the cursor is being displayed using absolute coordinates.

According to an example embodiment of the disclosure, at least one processor, individually and/or collectively, may be configured to determine coordinates of the cursor in a first direction in which the main display region is contracted, using a ratio between a first length of the first display region in the first direction and a second length of the second display region in the first direction, based on changing the cursor to display the cursor using the relative coordinates According to an example embodiment of the disclosure, at least one processor, individually and/or collectively, may be configured to move and display the cursor to an arbitrary position of the second display region, based on the contraction of the main display region being identified, while the cursor is being displayed using absolute coordinates.

According to an example embodiment of the disclosure, at least one processor, individually and/or collectively, may be configured to move and display the cursor to a position adjacent to a side at which the main display region is contracted, based on the contraction of the main display region being identified, while the cursor is being displayed using absolute coordinates.

According to an example embodiment of the disclosure, at least one processor, individually and/or collectively, may be configured to set a control region of the second input device, which is used to control the cursor, to correspond to the first display region, based on the connection of the second input device to the electronic device being identified, or as an input made through the second input device being identified, or to reset the control region such that the control region corresponds to the second display region, based on the size of the main display region being reduced from the first display region to the second display region being identified.

According to an example embodiment of the disclosure, at least one processor, individually and/or collectively, may be configured to obtain a size of the second display region stored in the memory, based on the change in size of the main display region being terminated, based on the main display region being determined as being changed to be in a specific size stored in the memory.

According to an example embodiment of the disclosure, at least one processor, individually and/or collectively, may be configured to identify the size of the second display region, through a sensor included in the electronic device, based on the change in the size of the main display region being terminated, based on the main display region not being determined as being changed to be in the specific size stored in the memory.

According to an example embodiment of the disclosure, at least one processor, individually and/or collectively, may be configured to move the position of the cursor, based on the reset control region, based on the control region being reset to correspond to the second display region.

According to an example embodiment of the disclosure, an electronic device may include: a variable display having a main display region changeable in size and including a first input device comprising a touch screen panel corresponding to the main display region, a memory, and at least one processor, comprising processing circuitry, electrically connected to the variable display and the memory. At least one processor, individually and/or collectively, may be configured to allow a control region of a second input device configured to control a cursor displayed in the main display region, currently corresponding to a first size of the main display region, to identify the change in size of the main display region and the second size, and to control a speed of the cursor based on the changed second size of the main display region.

According to an example embodiment of the disclosure, at least one processor, individually and/or collectively, may be configured to determine whether the speed of the cursor is increased, decreased, or maintained, based on a value of a factor for changing a speed being set, to determine a change amount in speed of the cursor, wherein the value of the factor for changing the speed may be set or stored in the memory.

According to an example embodiment of the disclosure, at least one processor, individually and/or collectively, may be configured to decrease the speed of the cursor, based on the value of the factor for changing the speed being greater than the ratio of the first size/the second size, maintain the speed of the cursor, based on the value of the factor for changing the speed being equal to the ratio of the first size/the second size, and increase the speed of the cursor, based on the value of the factor for changing the speed being less than the ratio of the first size/the second size. In this case, the second size is greater than the first size, and the size of the main display region may indicate the length of the main display region in one direction, when the main display region is expanded in the one direction.

According to an example embodiment of the disclosure, at least one processor, individually and/or collectively, may be configured to reset the control region to correspond to the second size.

According to an example embodiment of the disclosure, at least one processor, individually and/or collectively, may be configured to obtain the second size, which is stored in the memory, based on the change in the size of the main display region being terminated, based on the main display region being determined as being changed to be a specific size stored in the memory.

According to an example embodiment of the disclosure, at least one processor, individually and/or collectively, may be configured to identify the second size, through a sensor included in the electronic device, based on the change in the size of the main display region being terminated, based on the main display region not being determined as being changed to be a specific size stored in the memory.

According to an example embodiment of the disclosure, at least one processor, individually and/or collectively, may be configured to control the position of the cursor, such that the cursor is positioned in the reset control region, based on the control region being reset to correspond to the second size.

According to an example embodiment of the disclosure, at least one processor, individually and/or collectively, may be configured to use absolute coordinates or relative coordinates to display the position of the cursor.

According to an example embodiment of the disclosure, at least one processor, individually and/or collectively, may be configured to maintain the position of the cursor, even if the main display region is changed to be in the second size, as the absolute coordinates is used.

According to an example embodiment of the disclosure, at least one processor, individually and/or collectively, may be configured to determine coordinates of the cursor based on a direction in which the main display region is changed and a change amount in which the main display region is changed and to move the cursor, based on the main display region being changed to be in the second size, as the relative coordinates are used.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a flexible display having a first flexible region and a second flexible region extended from one side of the first flexible region,
      wherein, in a state in which entire of the second flexible region is inserted into the electronic device, the first flexible region that is visible through a first surface is provided as a first display region, and
      wherein, in a state in which a part of the second flexible region is inserted into the electronic device, the first flexible region and at least a portion of the second flexible region that visible through the first surface are provided as a second display region;
   memory storing instructions; and
   at least one processor, comprising processing circuitry, operatively connected to the flexible display and the memory,
   wherein at least one processor, individually and/or collectively, is configured to:
      determine whether a display region of the flexible display is changed from the first display region to the second display region while a cursor is output through the first flexible region,
      in response to determining that the display region is changed to the second display region, determine a position of the cursor based on a size of the second display region, and
      move the cursor based on the determined position of the cursor.

2. The electronic device of claim 1, wherein at least one processor, individually and/or collectively, is configured to:
   move the cursor into the first flexible region and output the moved cursor using relative coordinates wherein the relative coordinates are obtained based on an expanding ratio of the display region, based on the change of the display region to the second display region being identified, while the cursor is being displayed using absolute coordinates wherein the absolute coordinates are obtained based on a reference line located on a side of the first flexible region.

3. The electronic device of claim 2, wherein at least one processor, individually and/or collectively, is configured to:
   based on using relative coordinates, determine coordinates of the cursor using the expanding ratio, wherein the expanding ratio is a ratio between a first length for the first flexible region and at least the portion of the second flexible region provided as the second display region and a second length for the first flexible region provided as the first display region.

4. The electronic device of claim 1, wherein at least one processor, individually and/or collectively, is configured to:
   output the cursor through a control region set to correspond to the first display region,
   based on the display region of the flexible display being changed to the first display region, reset the control region corresponding to the second display region.

5. The electronic device of claim 4, wherein at least one processor, individually and/or collectively, is configured to:
   move a position of the cursor, based on the reset of control region, based on the control region being reset to correspond to the first display region.

6. The electronic device of claim 1, wherein at least one processor, individually and/or collectively, is configured to:
   move the cursor within the first flexible region while the display region is changed to the second display region.

7. The electronic device of claim 1, wherein at least one processor, individually and/or collectively, is configured to:
   based on the change of the display region to the first display region being identified, while the cursor is being displayed using absolute coordinates,
      move the cursor to a random position of the first flexible region and output the moved cursor; or
      move the cursor to a designated portion of the first flexible region adjacent to the second flexible region and output the moved cursor.

8. An operation method of an electronic device including a flexible display having a first flexible region and a second flexible region extended from one side of the first flexible region, wherein, in a state in which entire of the second flexible region is inserted into the electronic device, the first flexible region that is visible through a surface is provided as a first display region, and wherein, in a state in which a part of the second flexible region is inserted into the electronic device, the first flexible region and at least a portion of the second flexible region that visible through the first surface are provided as a second display region, the operation method comprising:
   determining whether a display region of the flexible display is changed from the first display region to the second first display region while a cursor is output through the first flexible region;
   in response to determining that the display region is changed to the second first-display region, determining a position of the cursor based on a size of the second display region; and
   moving the cursor based on the determined position of the cursor.

9. The operation method of claim 8, further comprising:
   moving the cursor into the first flexible region and output the moved cursor using relative coordinates wherein the relative coordinates are obtained based on an expanding ratio of the display region, based on the change of the display region to the second display region being identified, while the cursor is being displayed using absolute coordinates wherein the absolute coordinates are obtained based on a reference line located on a side of the first flexible region.

10. The operation method of claim 9, further comprising:
based on using relative coordinates, determining coordinates of the cursor using the expanding ratio, wherein the expanding ratio is a ratio between a first length for the first flexible region and at least the portion of the second flexible region provided as the second display region and a second length for the first flexible region provided as the first display region.

11. The operation method of claim 8, further comprising:
moving the cursor within the first flexible region while the display region is changed to the second display region.

12. The operation method of claim 8, further comprising:
based on the change of the display region to the first display region being identified, while the cursor is being displayed using absolute coordinates,
moving the cursor to a random position of the first flexible region and outputting the moved cursor; or
moving the cursor to a designated portion of the first flexible region adjacent to the second flexible region and outputting the moved cursor.

* * * * *